Aug. 26, 1952 A. M. BEST 2,608,046
SIDE RAKE TOOTH MOUNTING
Filed March 28, 1950
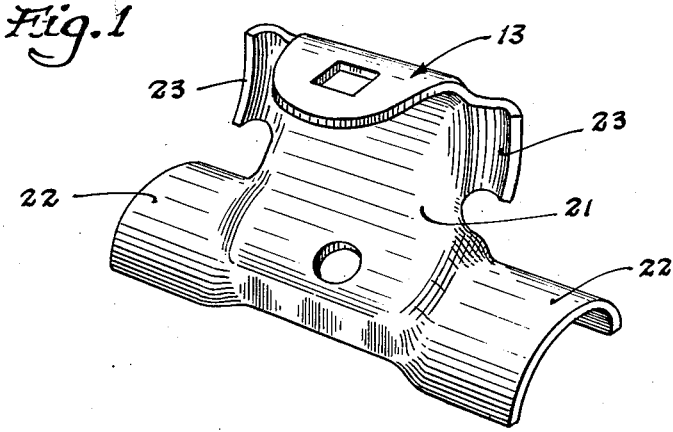
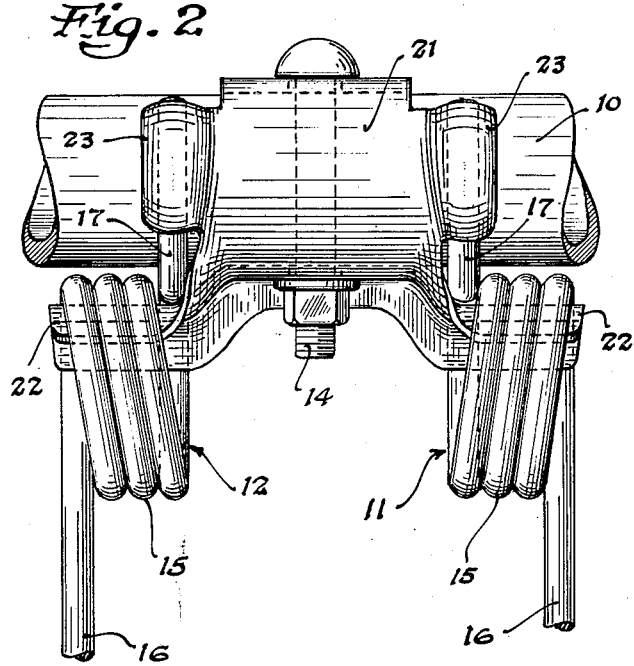
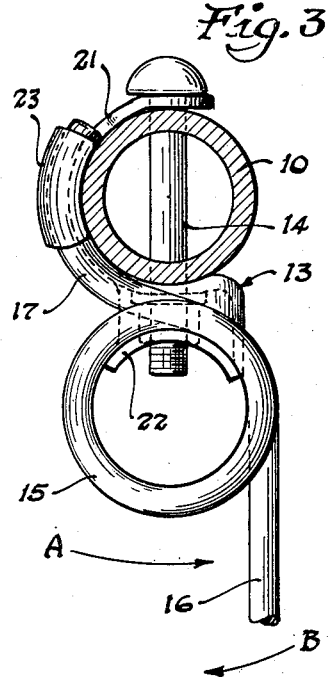
Inventor
Albert M. Best
By Allan R. Redrow
Attorney Patented Aug. 26, 1952

2,608,046

UNITED STATES PATENT OFFICE 2,608,046

SIDE RAKE TOOTH MOUNTING

Albert M. Best, New Holland, Pa., assignor to The New Holland Machine Division of The Sperry Corporation, New Holland, Pa., a corporation of Delaware Application March 28, 1950, Serial No. 152,390

7 Claims. (Cl. 56—400)

The present invention relates to an improved means that may be used for the mounting of resilient rake teeth, and more particularly is concerned with a unitary structure that is adapted to cooperate with a pair of resilient rake teeth means and a bar carried on the rotating reel of a side delivery rake, to simultaneously fix the pair of teeth to the bar and support them in their proper raking position. A number of the pairs of teeth and their cooperating mounting means may be provided for fixing the pairs of teeth to the several raking bars carried by the reel.

The invention basically takes the form of a clamping member having a generally C-shaped body portion constructed in such a manner that a number of the members are adapted to be removably secured to the rake tooth support bar and each clamping member has elements integral therewith which hold a pair of resilient raking teeth means in proper relation with respect to the raking bar. The clamping members are also provided with wing elements that serve to support or brace the pair of rake teeth means with which they each cooperate whereby a very simple unitary holding and bracing structure is provided for mounting each pair of teeth on the bar.

Referring to the drawings:

Figure 1 is a front perspective of the clamping or holding means;

Figure 2 is a rear elevation of a portion of a raking bar showing a pair of teeth assembled on the bar by means of a clamping member; and Figure 3 is a sectional end view of the raking bar showing the assembled relationship of the clamping means, the resilient tooth means, and the bar.

As above stated, this invention finds particular use in the conventional side delivery rake having a rotating reel wherein the reel has a plurality of raking bars, each of which is adapted to carry a number of raking teeth. The mounting means forming the subject of this invention provides an improved unitary structure for securing individual pairs of teeth to the bars.

In the drawings, 10 indicates one of the raking bars which may be normally carried in a rotating reel, and may have as many as sixteen pairs of raking teeth fixed thereto. The teeth means 11 and 12 may be provided in complementary pairs for mounting on the right and left hand side of the clamping means 13 which in turn is removably mounted on the raking bar 10 by means of the bolt 14. The clamping means cooperates with the bar to fix the teeth in a working position.

Each of the tooth means 11 and 12 has a spring coil portion 15 and a working tooth 16 formed integral therewith at the outer end of the coil, and at the inner end of the coil a stub end 17 is formed which end projects from the coil in a direction about tangent thereto and at almost 90° from the direction in which the working tooth projects. Preferably the stub end is curved to fit the round periphery of the raking bar 10 as is best shown in Figure 3.

Each of the pairs of complementary teeth means are partially supported from their respective clamp or bracket member 13 which is removably carried on the bar 10 and to provide a firm support for the teeth means, the body portion 21 of the clamp member 13 takes a generally C form so that it may be closely fitted to the bar 10 when it is bolted in position. The snugly fitted body portion 21 forms a solid clamping and supporting means and as is best shown in Figure 2, the pair of integral coil supporting wings 22 integral with the body 21, engage the inside of the coil portions 15 of the spring tooth means to provide a firm support to control the position of the working teeth 16.

The wings are shaped to fit inside the coils 15 of the teeth means and when the clamping means 20 is fixed on the bar 10, the wings 22 hold the coils of the teeth means shaped from but generally parallel to the bar 10 and they also hold the teeth means 11 and 12 in such a position that when the stub ends 17 of the teeth are laid against the rod, the working teeth 16 project generally perpendicular from the bar. The support wings function to control the movement of the working tooth during the contraction and expansion of the spring coil during the normal use of the rake, as will appear more fully below.

Integral with the upper section of the body portion 21 are a pair of ears 23 that engage against the outside surface of the stub ends 17 of the teeth means to hold the stubs in a relatively fixed position by engaging them loosely against bar 10. The engagement between the ears, the bar, and the stub ends 17 throughout a substantial portion of their length tends to hold the teeth in their proper positions with respect to the bar and the shape of the teeth means coupled with the support of their coils on wings 22, fixes the position of the working tooth 16 of each of the teeth means.

The teeth means 11 and 12 may be made of any conventional spring steel shape and are formed alike except that one is wound to have a right hand coil and the other is wound to have a left hand coil. As is best seen in Figure 3, the two tooth forms are mounted on the raking bar with their stub ends 17 pressed loosely against the back side of the raking bar with respect to its forwardly direction during raking, as indicated by arrow A, and the raking load is applied against the working teeth 16 in the relative direction of arrow B. In this manner as the working teeth are loaded, they bend over the forward surface of their respective wing supports 22 such that the coil portions 15 of the teeth means tend to turn in a clockwise direction, referring to Figure 3, whereby to force the stub ends 17 into firmer contact with the bar during the normal operation of the machine in raking. When the load is released, the working teeth move forwardly and the stressed coils unwind, the teeth means maintain their proper position, however, due to the confinement of the coils and stub ends between the bar and the clamping means.

The side rake machine having this form of rake tooth mounting may also be used for a tedding operation, and in this instance, where the rake reel is rotated in the opposite direction, the tendency of the stub end to push away from the bar 10 by a reversal of the loading of the spring means, is counteracted by ears 23 carried by the C-shaped body member 21. Thus, the teeth means are loosely but fixedly held in proper position with respect to the rake bar 10 during performance of either the raking or tedding operation.

In the use of this invention, the clamping means here described is operative to mount the several pairs of raking teeth on the individual raking bars of the rotating reel carried by a side delivery rake. The clamping means 13 serves to loosely but positively support the teeth from the rake bar so that all of the working teeth 16 of the teeth means project outwardly from the raking bar in the same direction. Since the teeth means are supported on wings 22 of the clamping means during operation of the rake, all of the teeth will be held projected in the same direction so that a positive control of the raking teeth is provided during normal operation of the machine.

As the working teeth are bent around the surface of the wings 22 upon being loaded or striking an obstruction, the coil spring portion 15 will bear against the surface of the wings as the coil winds or unwinds depending upon the direction of the loading. However, as the teeth means are stressed, their motion is controlled by reason of their contact with the wing 22, and this bearing surface which frictionally engages inside of the coil not only serves to guide the movement of the working tooth portion 16, but also tends to dampen out any vibrations which would otherwise be present upon the sudden release of a working tooth from behind an obstruction.

It will also be noted that should either of the tooth means break, as quite frequently happens in normal operation of a side delivery rake, the broken tooth means may be quickly replaced by merely loosening the clamping means 13 and inserting a new tooth means in place. The construction here provided serves to not only loosely confine the tooth means in use, but may be quickly removed to permit assembly of a new tooth means on the raking bar whenever necessary.

It is apparent that while the above description covers the preferred form of this invention, that many modifications thereof may occur to those skilled in the art which will fall within the scope of the following claims.

I claim:

1. The combination of a bar, a pair of resilient raking tooth means, and a unitary holding means for mounting said tooth means on said bar comprising a means for removably fixing said holding means on said bar, each of said tooth means having a spring coil with a working tooth and a stub end extending from opposite ends thereof in different directions, said holding means having a seat for engagement on the bar, a pair of wing portions offset from said seat and away from the surface of said bar and extending from the opposite sides of the seat in a generally parallel direction with respect to the axis of said bar, each of said wings being disposed to support the respective coils of each of said pair of tooth means, and a pair of ears integral with said holding means for engaging the stub ends of said pair of tooth means to engage them against the bar.

2. The combination of a bar, a pair of resilient raking tooth means, and a unitary holding means for mounting said tooth means on said bar comprising a means for removably fixing said holding means on said bar, each of said tooth means having a spring coil with a working tooth and a stub end extending from opposite ends thereof in different directions, said holding means having a body shaped to partially surround said bar, said body having projecting coil supporting wings integral therewith and a pair of ears to engage the stub ends against said bar, said wings being offset from said bar but having their surfaces in a lengthwise direction generally parallel with the longitudinal axis of said bar, whereby said wings and ears engage said tooth means to confine their stub ends and coils such that the tooth means are supported substantially rigidly from the bar.

3. In a side delivery rake having a rotating reel provided with round bars for supporting a plurality of resilient raking teeth means made out of round spring steel; each tooth means having an integral coil spring portion turned in such a manner that when the tooth means is mounted on said bar, the coil is disposed so that its longitudinal axis is generally parallel to the surface of said bar; and wherein each of said tooth means also has a working tooth portion extending in one direction from one end of said coil and a stub end that is curved to the perifery of said bar and extends in another direction from the other end of said coil; the improvement comprising, a holding means for supporting each one of a pair of the resilient tooth means; means for fixedly securing the holding means on the bar; said holding means having integral coil supporting wings for cooperating with each one of said pair of said tooth means; and another portion of said holding means being spaced from the bar a distance a bit larger than the diameter of the spring rod and being positioned to engage the stub curved ends of each of a pair of said tooth means loosely against the perifery of the raking bar.

4. The combination of a bar, a resilient raking tooth means, and a holding means for mounting said tooth means on said raking bar comprising a tooth means formed from a spring steel shape and having a coil portion, a working tooth means extending in one direction from said coil and a bar engaging stub means extending in another direction from the other end of said coil, the holding means being adapted to be rigidly supported on said bar and having at least one ear element integral therewith for engaging the stub means against the bar, said at least one ear element being normally spaced from the bar a distance slightly greater than the cross-sectional dimension of said stub means in a direction substantially perpendicular to said bar, and coil supporting means integral with said holding means for engaging inside said coil portion.

5. The combination of a round bar; resilient raking tooth means; and a holding means for mounting said tooth means on said raking bar comprising a pair of tooth means formed from round spring steel wire, and each tooth means having a coil portion, a working tooth means extending in one direction from said coil, and a bar engaging stub means shaped to the perifery of said bar extending in another direction from the other end of said coil; the holding means being adapted to be rigidly supported on said bar and having a pair of ear elements integral therewith for engaging both of the stub means against the perifery of the bar, said ear elements being normally spaced from the bar a distance slightly greater than the diameter of said stub means, and a pair of coil supporting means integral with said holding means for engaging inside said coil portions.

6. In a combination with a rake tooth supporting bar of substantially round cross section, a rake tooth holder extending circumferentially at least halfway around said bar, a connecting element extending diametrically through said bar and the circumferentially opposed ends of said holder to secure the latter in operative position, the holder comprising a pair of integral spring supporting wings projecting from opposite sides thereof parallel to said bar and spaced from said bar, and a pair of retainer ears integral with said holder and projecting from opposite sides of said holder in directions parallel to said bar, each of the ears having a portion spaced from said bar to receive a portion of a rake tooth.

7. A holder for spring rake teeth comprising a generally semicyclindrical body portion having relatively diametrically opposed holes therethrough, wings integral with said body portion projecting from opposite sides of said body portion parallel to the cylindrical axis thereof, said wings being cylindrically curved about an axis transverse to the cylindrical axis of said body portion, and retainer ears integral with said body portion projecting from opposite sides thereof.

ALBERT M. BEST.

REFERENCES CITED

The following references are of record in the file of this patent:

UNITED STATES PATENTS

| Number | Name | Date |
|---|---|---|
| 1,978,717 | Oppenheim | Oct. 30, 1934 |
| 2,432,653 | Bloom | Dec. 16, 1947 |